March 16, 1965   W. A. RINGLE   3,173,674
UNIVERSAL COMPRESSION SAFETY CLAMP
Filed March 23, 1962   2 Sheets-Sheet 1
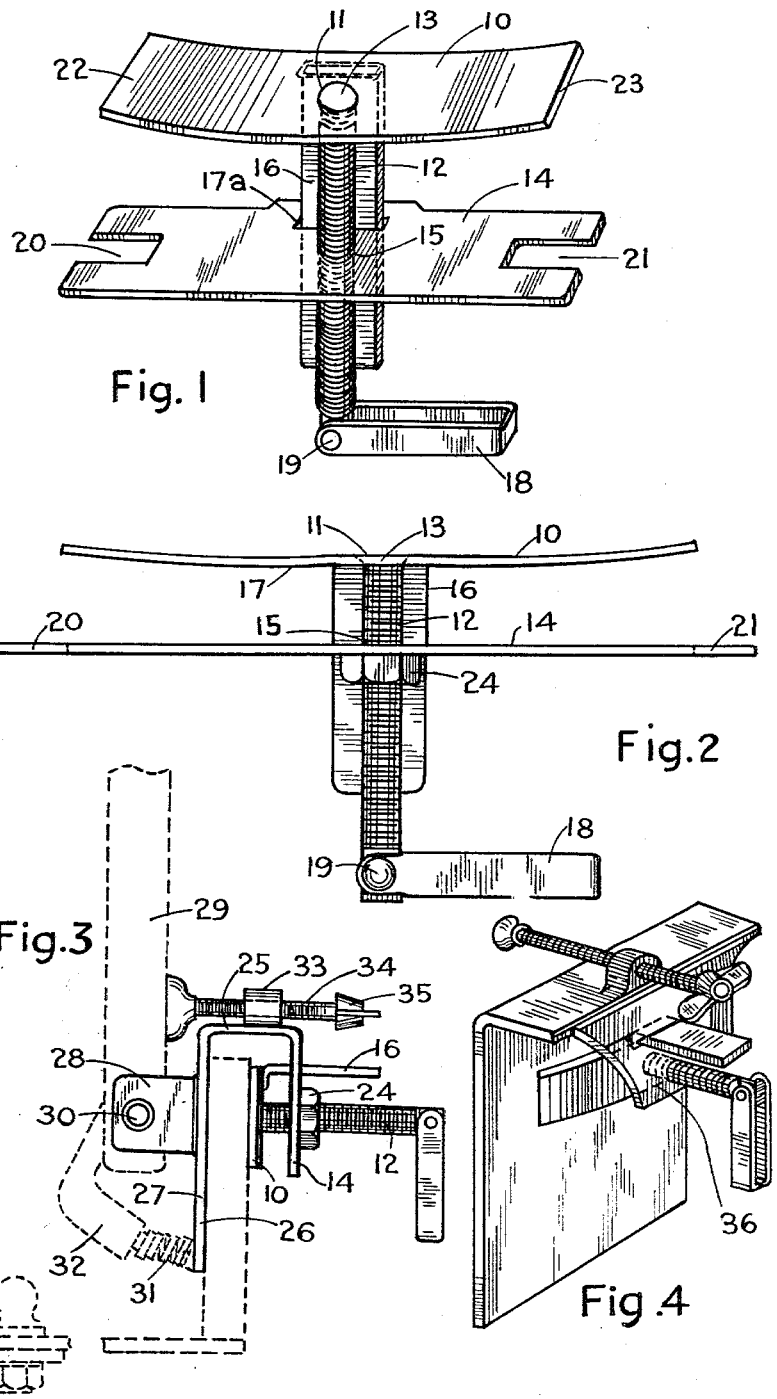

March 16, 1965  W. A. RINGLE  3,173,674
UNIVERSAL COMPRESSION SAFETY CLAMP
Filed March 23, 1962  2 Sheets-Sheet 2

United States Patent Office 3,173,674
Patented Mar. 16, 1965

3,173,674
UNIVERSAL COMPRESSION SAFETY CLAMP
Wilfred A. Ringle, Debolt, Alberta, Canada (% Wilf's Day & Night Service, Box 490, Grande Prairie, Alberta, Canada)
Filed Mar. 23, 1962, Ser. No. 182,045
3 Claims. (Cl. 269—97)

The invention relates to a universal compression safety clamp, particularly to a clamp that can be used for clamping various articles in shops or for clamping outboard motors on boats or on the rear of cars.

The main object of this invention is to provide a universal compression safety clamp that is dependable, durable, economically manufactured, and simple to operate.

Another object is to provide a universal compression safety clamp that has at least 50% more clamping power than the clamps in present use.

Another object is to provide a universal compression safety clamp in which vibration has no effect on its stability and thus the possibility of its becoming loose by vibration is prevented.

Another object is to provide a universal safety compression clamp that does not need to be overly tightened to hold it securely in the desired position.

Another object is to provide a universal compression safety clamp that works only on center thrust.

These objects are accomplished by providing a universal compression clamp consisting of a thrust bar and a compression spring bar. A screw shaft is rotatably mounted centrally and at right angles to the inner side of the compression spring bar. The screw shaft passes vertically to and through a central screw threaded opening in the thrust bar. A nut may be welded around the outer edge of the threaded opening to provide further threaded bearing support for the screw shaft. A guide bar for maintaining the compression spring bar and the thrust bar in opposed position is fixedly connected vertically to the inner side of the compression spring bar. A slot is provided in the thrust bar near one side of and centrally of the length of the thrust bar through which the guide bar slides. A pivoted handle is mounted on the outer end of the screw shaft for rotating the screw shaft and compressing the compression spring bar against a boat transom or other support to which it is to be clamped.

The invention consists in the novel arrangements, construction and combination of parts hereinafter described and shown in the drawings.

FIGURE 1 is a perspective view of the universal compression clamp as adapted for outboard motors;

FIGURE 2 is a plan view of the universal compression clamp shown in FIGURE 1;

FIGURE 3 is an elevation view of the universal compression clamp combined with an outboard airdrive clamp;

FIGURE 4 is a modification of the device shown in FIGURE 3;

Figure 5:
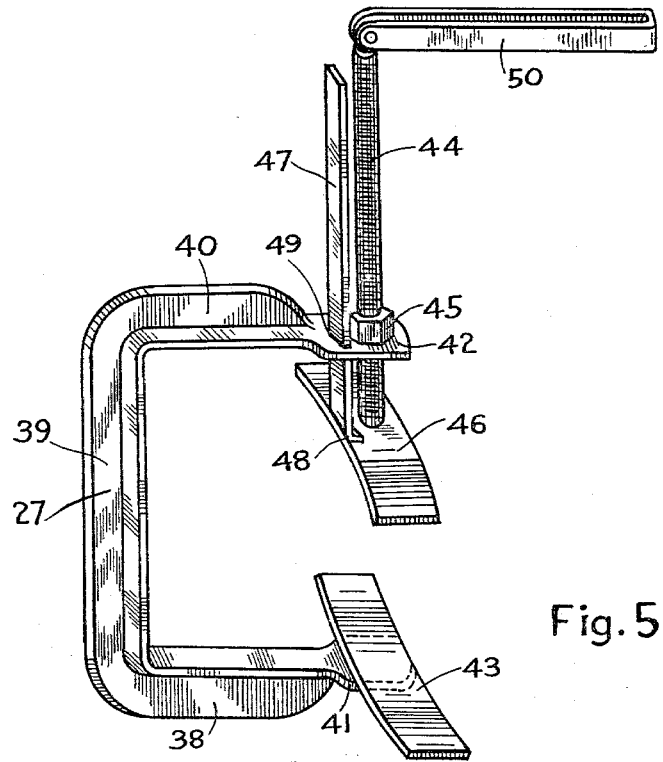
FIGURE 5 is a perspective view of a modification for use as universal compression shop clamp.

Referring to the drawings, FIGS. 1 and 2 disclose the form of compression safety clamp for use with the conventional U-shaped supporting brackets of an outboard motor. The clamp consists of a compression spring bar 10, rectangular shaped, having a central aperture 11, and curved longitudinally. A screw shaft 12 is mounted to rotate freely in the aperture 11 at right angles to the inner side of the compression spring bar 10. The outer end 13 of the screw shaft 12 is enlarged to prevent it becoming disconnected from the compression spring bar 10. A thrust bar 14 is screw threadedly mounted on the screw shaft 12 by means of an aperture 15. In order to provide greater bearing surface for the screw shaft 12 in the aperture 15 of the thrust bar 14 a nut 24 may be welded around the aperture 15.

A guide bar 16 is fixedly connected, e.g., welded to the inner side 17 and at right angles to the compression spring bar 10. A slot 17a is formed in the thrust bar 14 above the aperture 15 through which the guide bar 16 slides. The guide bar 16 is of sufficient length in relation to the screw shaft 12 so that when the screw shaft 12 is rotated the guide bar will not become disassociated from the slot 17a.

A handle 18 is pivoted at 19 for rotating the screw shaft 12. The thrust bar 14 is provided with slots 20 and 21 for attaching the thrust bar to the conventional U-shaped brackets of an outboard motor.

The main feature of this type of clamp as shown in FIGURES 1 and 2 is the curved compression spring bar 10 and the guide bar 16. When center thrust is applied by the thrust bar 14 and screw shaft 12, the thrust starts at the ends 22 and 23 of the compression spring bar 10 and when fully tightened it takes the place of three or more conventional clamps. The compression against screw shaft 12 and thrust plate 14 makes the clamp safe against vibration effects. The guide bar 16 being fixed to compression spring bar 10 and sliding through slot 17 of thrust bar 14 prevents tipping or binding of the spring bar 10.

The single screw shaft 12 provided for tightening the clamp of this invention reduces mounting time over previous types of clamps which use two screw shafts and with which it is necessary to make sure they are of similar torque.

Referring to FIGURES 3 and 4, modifications of the clamp are shown for supporting an outboard drive motor. In FIGURE 3 the clamp is provided with the compression spring plate 10, screw shaft 12, thrust bar 14, the guide bar 16, and the pivoted handle as previously described in FIGURES 1 and 2. The thrust bar is extended upwards, then bent at right angles to provide a clamp member 25 having a depending leg 26. At the outer side 27 of the leg 26 is shown a bracket 28 to which a shaft 29 of the air drive motor is pivotally attached at 30. A spring 31 is shown mounted between the lower extended end 32 of the shaft 29. A nut 33 is welded or otherwise connected to the upper surface of the clamp member 25. A screw shaft 34 passes through the nut 33 and is adjustably engaged with the motor shaft 29 by turning the finger grip 35. The clamp is shown attached on the rear bumper of a car for transportation only but fastens to a boat transom in the same manner.

In FIGURE 4 the only change from the modification shown in FIGURE 3 is the use of a thrust spring bar 36 instead of the thrust bar 14 shown in FIGURE 3. The other parts are the same.

Figure 6:
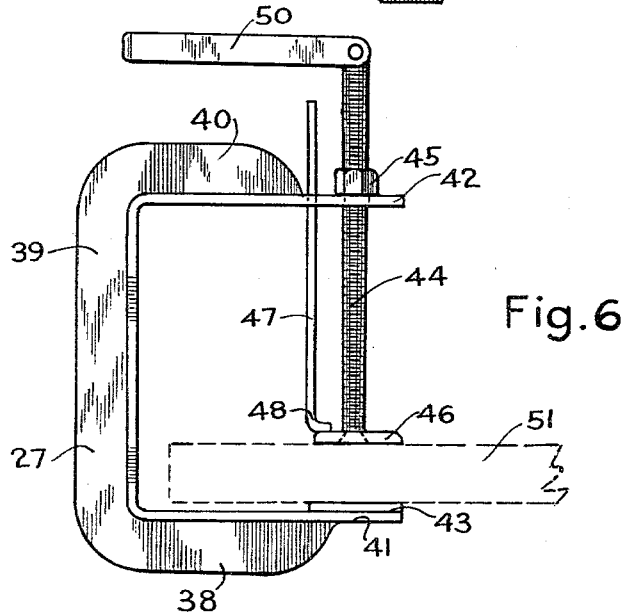
FIGURE 6 is an elevational view of the modification shown in FIGURE 5.

Referring to FIGURES 5 and 6 a universal compression shop clamp is shown which consists of a U-shaped member formed of three parts 38, 39 and 40 which may be held in a vice or otherwise where wanted in a work shop. The two parts 38 and 40 have extensions 41 and 42. A compression spring bar 43 is welded to the extension 41. A screw shaft 44 is screw threadedly connected to the extension 42 at 45 and mounted to rotate freely on a compression spring bar 46. A guide bar 47 is welded to the spring bar 46 at 48 and slides through a slot 49 in the extension 42. A pivotally mounted handle 50 is shown for operating the screw shaft 44. FIGURE 6 shows a work piece clamped in position. The clamp can be used in any position and in any place depending on size and dimensions, as smaller or larger clamps can be made. The clamp shown in FIGURES 5 and 6 has the two compression spring bars 43 and 46 giving it double compression and does not crawl or slip when in use.

While the invention has been fully described with particular reference to the specific embodiments it is understood it is to be construed broadly and limited only by the scope of the claims.

The embodiments of the invention in which an exclusive property or privilege is claimed are defined as follows.

I claim:

1. A universal compression safety clamp for attaching an article to a support comprising an elongated compression spring bar longitudinally curved throughout its length with the concave face of the bar disposed to contact one face of the support, a screw shaft having one end rotatably mounted in the center of said bar midway its length and extending from the convex face of said bar, a guide bar having one end fixedly attached to said spring bar along one longitudinal edge and at right angles to said spring bar in spaced parallel relation to said screw shaft, a thrust member spaced from and in opposed relation to said spring bar having a screw threaded bearing to receive said screw shaft, said member having a slot to slidably receive said guide bar, a clamp member carried by said thrust member disposed to be in contact with the other face of the support and means for rotating said screw shaft to move said clamp member and said thrust bar into clamping engagement with the support.

2. A universal compression safety clamp as describd in claim 1 wherein said clamp member is U-shaped with one leg extending over the support and in contact with the other face of said support.

3. A universal compression safety clamp as described in claim 2 including a second screw shaft mounted on top of said clamp member.

References Cited by the Examiner
UNITED STATES PATENTS 2,608,748   9/52   Gamboney _____ 269—87.2 X
3,002,745  10/61   Via _____ 269—91 X ROBERT C. RIORDAN, *Primary Examiner.*
THOMAS J. HICKEY, *Examiner.*